(12) United States Patent
Tanaka (10) Patent No.: US 8,482,380 B2
(45) Date of Patent: Jul. 9, 2013

(54) INPUT AIDING APPARATUS AND INPUT AIDING METHOD

(75) Inventor: Masami Tanaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 542 days.

(21) Appl. No.: 12/784,373

(22) Filed: May 20, 2010

(65) Prior Publication Data

US 2011/0018730 A1     Jan. 27, 2011

(30) Foreign Application Priority Data

Jul. 24, 2009   (JP) ................................ 2009-173503

(51) Int. Cl.
*G05B 19/00*   (2006.01)
*G06F 7/00*    (2006.01)
*G06K 9/00*    (2006.01)
*G08B 29/00*   (2006.01)
*H04B 1/00*    (2006.01)

(52) U.S. Cl.
USPC ......... 340/5.51; 340/5.53; 340/6.1; 340/7.51; 340/8.1

(58) Field of Classification Search
USPC ............. 340/5.51, 5.53, 6.1, 7.51, 8.1, 12.24, 340/13.31; 725/53, 52; 715/816, 257; 345/169
See application file for complete search history.

(56) References Cited

U.S. PATENT DOCUMENTS

| 6,011,554 | A  | * | 1/2000 | King et al. ..................... 715/811 |
| 6,744,423 | B2 | * | 6/2004 | Kraft et al. .................... 345/169 |
| 7,934,236 | B1 | * | 4/2011 | Amir et al. ....................... 725/53 |
| 8,117,540 | B2 | * | 2/2012 | Assadollahi .................. 715/256 |
| 8,234,589 | B2 | * | 7/2012 | Baker et al. ................... 715/835 |

FOREIGN PATENT DOCUMENTS

| JP | 58-87615 A    | 5/1983  |
| JP | 11-191094 A   | 7/1999  |
| JP | 2002-329389 A | 11/2002 |
| JP | 2006-237830 A | 9/2006  |

* cited by examiner

*Primary Examiner* — Nam V Nguyen

(74) *Attorney, Agent, or Firm* — Knobbe, Martens Olson & Bear LLP (57) ABSTRACT

According to one embodiment, an input aiding apparatus comprises an aiding module, wherein in the case where the selection of an input column in the direction toward the head or tail end is requested with the head or tail end input column, respectively, already selected, the tail end or the head input column, respectively, is selected, and at the same time, a predetermined number, character or code is displayed in all vacant input columns automatically and collectively.

4 Claims, 10 Drawing Sheets

Set input

| 1 | 6 |
|---|---|
| 2 | 7 |
| 3 | 8 |
| 4 | 9 |
| 5 | 0 |

| a | f | k | p | u | z | ? |
|---|---|---|---|---|---|---|
| b | g | l | q | v | # | ! |
| c | h | m | r | w | : | - |
| d | i | n | s | x | / | . |
| e | j | o | t | y | ( | ) |

| Space |
|---|
| Half size |

37

Select with ◄ ▲ ▼ ► and confirm with Enter key

INPUT AIDING APPARATUS AND INPUT AIDING METHOD

CROSS-REFERENCE TO RELATED APPLICATIONS

This application is based upon and claims the benefit of priority from Japanese Patent Application No. 2009-173503, filed Jul. 24, 2009, the entire contents of which are incorporated herein by reference.

BACKGROUND

1. Field

One embodiment of the invention relates to an input aiding apparatus and an input aiding method for supporting the operation of inputting numbers or characters sequentially in a plurality of input columns displayed in a predetermined array.

2. Description of the Related Art

As is well known, digital broadcasting has become the mainstream in recent years. In the digital broadcasting, or especially, at the time of receiving data broadcasting, a user is often required to input a postal code of a specified area in order to acquire the information on the specified area or a plurality of numbers and characters in order to answer a question from a viewer.

In such a case, the user inputs numbers or characters sequentially in a plurality of input columns displayed in a predetermined array on the screen. In the process, the numbers or characters, even if continuous, are required to be input one by one. Under the circumstances, therefore, the input operation is very bothersome for the user.

Jpn. Pat. Appln. KOKAI Publication No. 2006-237830 discloses a technique using input means including rotation means and joystick means, in which the information for data input is sequentially displayed on a child screen by the operation of the rotation means, and the data input is determined by the joystick means, thereby realizing the operation to input numbers with a remote controller having no number buttons.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an input aiding apparatus comprises an aiding module, wherein in the case where the selection of an input column in the direction toward the head or tail end is requested with the head or tail end input column, respectively, already selected, the tail end or the head input column, respectively, is selected, and at the same time, a predetermined number, character or code is displayed in all vacant input columns automatically and collectively.

Figure 1:
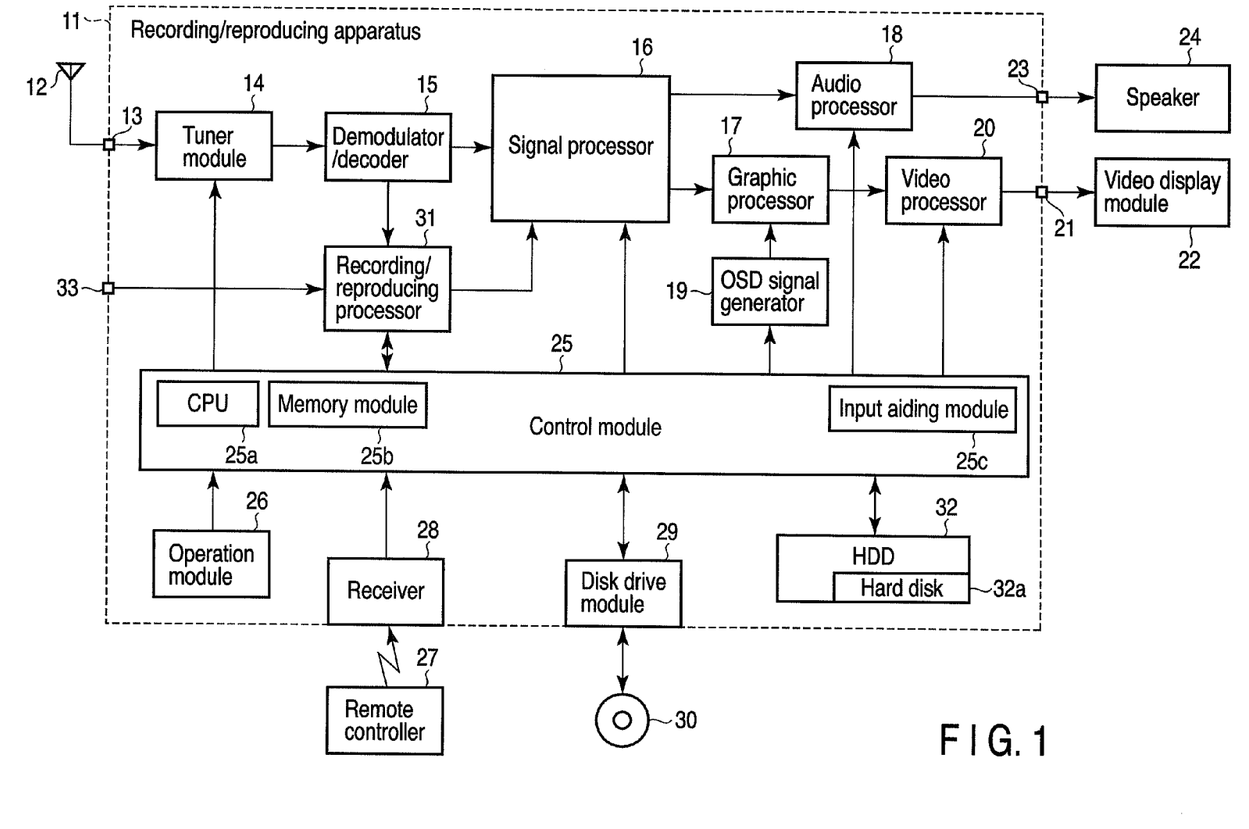
FIG. 1 is a block diagram for explaining an example of a signal processing system of a recording/reproducing apparatus according to an embodiment of the invention.

FIG. 1 shows a signal processing system of a recording/reproducing apparatus 11 according to this embodiment. This recording/reproducing apparatus 11 has a function of receiving digital broadcasting. Specifically, a digital broadcast signal received by an antenna 12 is supplied to a tuner module 14 through an input terminal 13 so that the broadcast signal of a desired channel is selected. The broadcast signal selected by the tuner module 14 is supplied to a demodulator/decoder 15, and after being restored to a digital video or audio signal, output to a signal processor 16.

This signal processor 16 digitally processes, in a predetermined way, the digital video and audio signals supplied from the demodulator/decoder 15. From the signal processor 16, the digital video signal is output to a graphic processor 17 and the digital audio signal to an audio processor 18.

The graphic processor 17 has such a function that an on-screen display (OSD) signal generated by an OSD signal generator 19 is superimposed on the digital video signal supplied from the signal processor 16. The digital video signal output from the graphic processor 17 is supplied to a video processor 20.

In the video processor 20, the digital video signal input thereto, after being converted into an analog video signal in a format displayable on a video display module 22 in the subsequent stage, is output to and displayed as an image on the video display module 22 through an output terminal 21.

In the audio processor 18, on the other hand, a digital audio signal input thereto, after being converted into an analog audio signal in a format reproducible by a speaker 24 in the subsequent stage, is output to and aurally reproduced by the speaker 24 through an output terminal 23.

All the operations including various receiving operations of the recording/reproducing apparatus 11 are centrally controlled by a control module 25. The control module 25 includes a central processing unit (CPU) 25a which, upon reception of the operation information from an operation module 26 arranged in the main body of the recording/reproducing apparatus 11 or the operation information sent from a remote controller 27 and received by a receiver 28, controls each component part in such a manner as to reflect the contents of the operation information.

In this case, the control module 25 utilizes a memory module 25b. The memory module 25b mainly includes a read-only memory (ROM) which stores a control program executed by the CPU 25a, a random access memory (RAM) which provides a working area to the CPU 25a and a non-volatile memory which stores the various setting information and the control information.

Also, the control module 25 is connected with a disk drive module 29. The disk drive module 29, on which an optical disk 30 such as a digital versatile disk (DVD) is replaceably mounted, has a function of recording/reproducing the digital data in and from the optical disk 30 thus mounted.

The control module 25, based on the user operation of the operation module 26 or the remote controller 27, can perform such a control operation that the digital video and audio signals obtained from the demodulator/decoder 15, after being encrypted and converted into a predetermined recording format by a recording/reproducing processor 31, are supplied to the disk drive module 29 and recorded in the optical disk 30.

Further, the control module 25, based on the user operation of the operation module 26 or the remote controller 27, can perform such a control operation that the digital video and audio signals, after being read from the optical disk 30 by the disk drive module 29 and decoded by the recording/reproducing processor 31, are supplied to the signal processor 16, thereby making it possible to use these signals for image display and voice reproduction subsequently.

The control module 25 is connected with a hard disk drive (HDD) 32. The control module 25, based on the user operation of the operation module 26 or the remote controller 27, can perform the control operation in such a manner that the digital video and audio signals obtained from the demodulator/decoder 15, after being encrypted and converted into a predetermined recording format by the recording/reproducing processor 31, are supplied to the HDD 32 and recorded in a hard disk 32a.

Also, the control module 25, based on the user operation of the operation module 26 or the remote controller 27, performs the control operation in such a manner that the digital video and audio signals, after being read from the hard disk 32a by the HDD 32, decoded by the recording/reproducing processor 31 and supplied to the signal processor 16, are used for the video display and audio reproduction described above.

Furthermore, the recording/reproducing processor 31 is connected with an input terminal 33. The input terminal 33 is for directly inputting the digital video and audio signals from a signal source external to the recording/reproducing apparatus 11. The digital video and audio signals input through the input terminal 33, under the control of the control module 25, are supplied through the recording/reproducing processor 31 to the signal processing unit 16, and subsequently used for video display and audio reproduction as described above.

Also, the digital video and audio signals input through the input terminal 33 are supplied through the recording/reproducing processor 31 and, under the control of the control module 25, used for recording and reproduction in and from the optical disk 30 by the disk drive module 29 on the one hand and for recording and reproduction in and from the hard disk 32a by the HDD 32 on the other hand.

The control module 25 comprises an input aiding module 25c. The input aiding module 25c, as described in detail later, has such a supporting function to facilitate the operation by the user to input numbers and characters sequentially in a plurality of input columns displayed in a predetermined array on the screen of the video display module 22.

Figure 2:
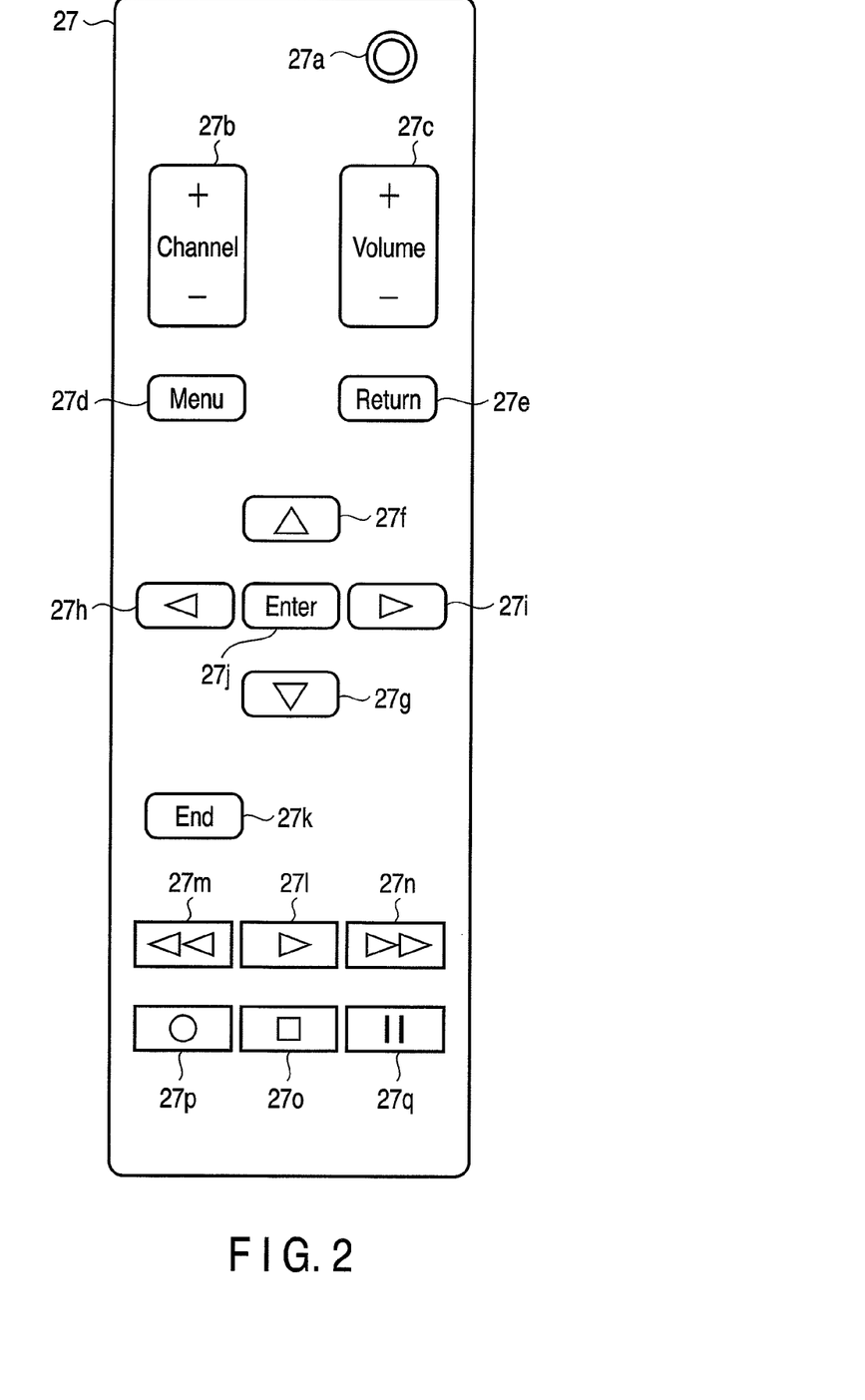
FIG. 2 is an external view for explaining an example of a remote controller of the recording/reproducing apparatus according to the same embodiment.

FIG. 2 shows the external appearance of the remote controller 27. The remote controller 27 mainly includes a power key 27a, a channel up-down key 27b, a volume adjust key 27c, a menu key 27d, a return key 27e, a cursor-up key 27f, a cursor-down key 27g, a cursor-left key 27h, a cursor-right key 27i, an Enter key 27j and an End key 27k.

The remote controller 27 also includes a reproduction (play) key 27l, a rapid back feed key 27m, a rapid forward feed key 27n, a stop key 27o, a record key 27p and a pause key 27q used for the disk drive module 29 and the HDD 32.

Figure 3:
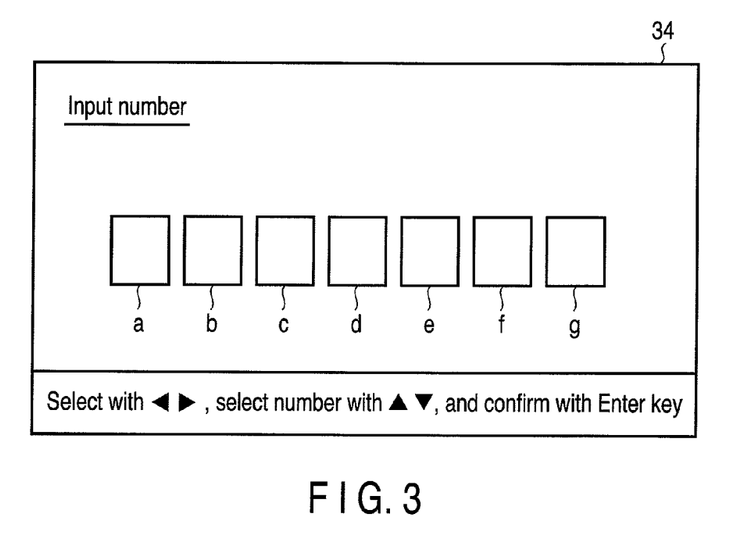
FIG. 3 is a diagram for explaining an example of a number input screen displayed on the recording/reproducing apparatus according to the same embodiment.

Consider a case in which the user inputs a postal code of a specified area to receive the data broadcasting and acquire the information on the specified area. In this case, the user operates the menu key 27d of the remote controller 27 and makes his/her way into a plurality of menu screens in a hierarchical structure. Thus, as shown in FIG. 3, for example, a number input screen 34 is displayed on the screen of the video display module 22.

On the number input screen 34, seven input columns in each of which one of 11 characters "vacant", "0", "1", "2", ..., "9" is to be input are arranged in one horizontal row on the screen. An explanation is given about a case in which the head or most significant digit is input in the leftmost input column, the tail end or least significant digit in the rightmost input column, and by designating the input columns as a, b, c, d, e, f, g in that order from head to tail end, a number is input in each of the input columns a to g using the input aiding function of the input aiding module 25c.

Figure 4:
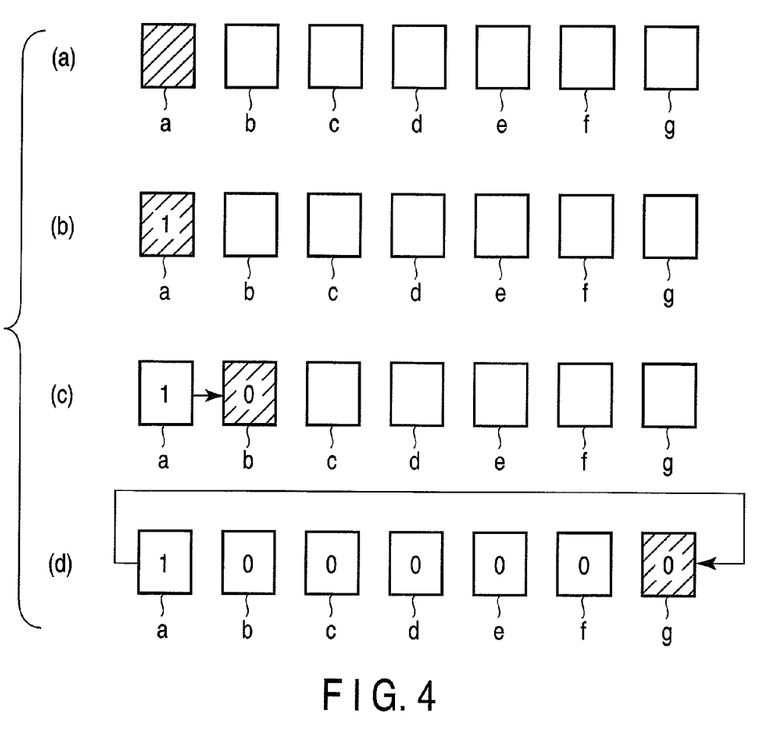
FIG. 4 is a diagram for explaining a first example of a number input operation performed using an input aiding module of the recording/reproducing apparatus according to the same embodiment.

FIG. 4 shows a first example of inputting a number in each of the input columns a to g. When the number input screen 34 is displayed first on the screen of the video display module 22, as shown in (a) of FIG. 4, all the input columns a to g are vacant, and the head input column a is selected as indicated by hatching.

Under this condition, the user operates the cursor-up key 27f of the remote controller 27. Each time of the operation, numbers "0", "1", "2", ..., "9", ..., "(vacant)", ..., "0" are displayed in ascending order circularly one by one in the input column a. On the other hand, assume that the user operates the cursor-down key 27g of the remote controller 27. Each time of the operation, numbers "0", "(vacant)", "9", "8", ..., "1", "0" are displayed in descending order circularly one by one in the input column a.

Then, in the case where the user operates the Enter key 27j of the remote controller 27 with "1", for example, displayed in the input column a as shown in (b) of FIG. 4, number "1" is set in the input column a.

After a predetermined number ("1" in the case under consideration) is set in the input column a as described above, assume that the user operates the cursor-right key 27i of the remote controller 27. As shown in (c) of FIG. 4, the input column b next to be the head column, i.e. immediately next to the head input column a and nearer to the tail end is selected as indicated by hatching, and a predetermined number ("0" in the case under consideration) is automatically displayed in the input column b.

As a result, the user intending to set number "0" in the input column b can so set directly by operating the Enter key 27j of the remote controller 27.

In the case where a number other than "0" is to be set in the input column b, on the other hand, the user can freely change the number in the input column b by operating the cursor-up key 27f or the cursor-down key 27g of the remote controller 27. Once the number to be set is displayed in the input column b, the user can set the particular number in the input column b by operating the Enter key 27j of the remote controller 27.

After setting a predetermined number in the input column b, assume that the user operates the cursor-right key 27i of the remote controller 27. Then, the next head input column c after the input column b, i.e. the input column c one column nearer to the tail end than the input column b is selected, and a predetermined number ("0" also in the case under consideration) is displayed automatically in the input column c.

The number "0" displayed in the input column c is also set directly by the operation of the Enter key 27j of the remote controller 27 by the user. Also, the number "0" displayed in the input column c can be freely changed by the user operating the cursor-up key 27f or the cursor-down key 27g of the remote controller 27, and the user, by operating the Enter key 27j of the remote controller 27, can set the number displayed in the input column c.

Also, with regard to each of the remaining input columns d to g, as in the aforementioned cases, a predetermined number is automatically selected and displayed by the user operating the cursor-right key 27i of the remote controller 27 after setting a number in the preceding (left adjacent) input column. Thus, the user can select and set a number. By repeating this operation, a number can be set in each of all the input columns a to g completely.

Further, assume that after setting a predetermined number ("1" in the case under consideration) in the head input column a as shown in (b) of FIG. 4, the user operates the cursor-left key 27h of the remote controller 27, i.e. the operation of selecting the head (most significant digit) input column is performed in spite of the fact that the head (most significant digit) input column a is already selected.

Then, as shown in (d) of FIG. 4, the tail end input column g is selected as indicated by hatching in FIG. 4, and at the same time, a predetermined number ("0" in the case under consideration) is automatically displayed in every input column (b to g in the case under consideration) which was vacant at the time of selection of the tail end input column g.

In any input column in which number "0" is to be set among the input columns b to g, therefore, the user can set number "0" by operating the cursor-left key 27h or the cursor-right key 27i of the remote controller 27 to select the particular input column and then operating the Enter key 27j.

In any input column in which a number other than "0" is to be set among the input columns b to g, on the other hand, the user selects the particular input column by operating the cursor-left key 27h or the cursor-right key 27i of the remote controller 27, and changes the number on display in the selected input column by operating the cursor-up key 27f or the cursor-down key 27g of the remote controller 27. Once the number to be set is displayed in the particular input column thereafter, the user sets the number on display in the input column b by operating the Enter key 27j of the remote controller 27.

According to the first example described above, the operation of selecting the head (most significant digit) input column is performed in spite of the fact that the head (most significant digit) input column a is already selected. Then, the tail end input column g is selected and a predetermined number is automatically displayed in every input column thus far vacant.

By inputting a predetermined number in a plurality of input columns collectively as described above, the user is not required to input the same number in the plurality of the columns one by one, with the result that the user operation is facilitated for a sufficiently high practicability.

Figure 5:
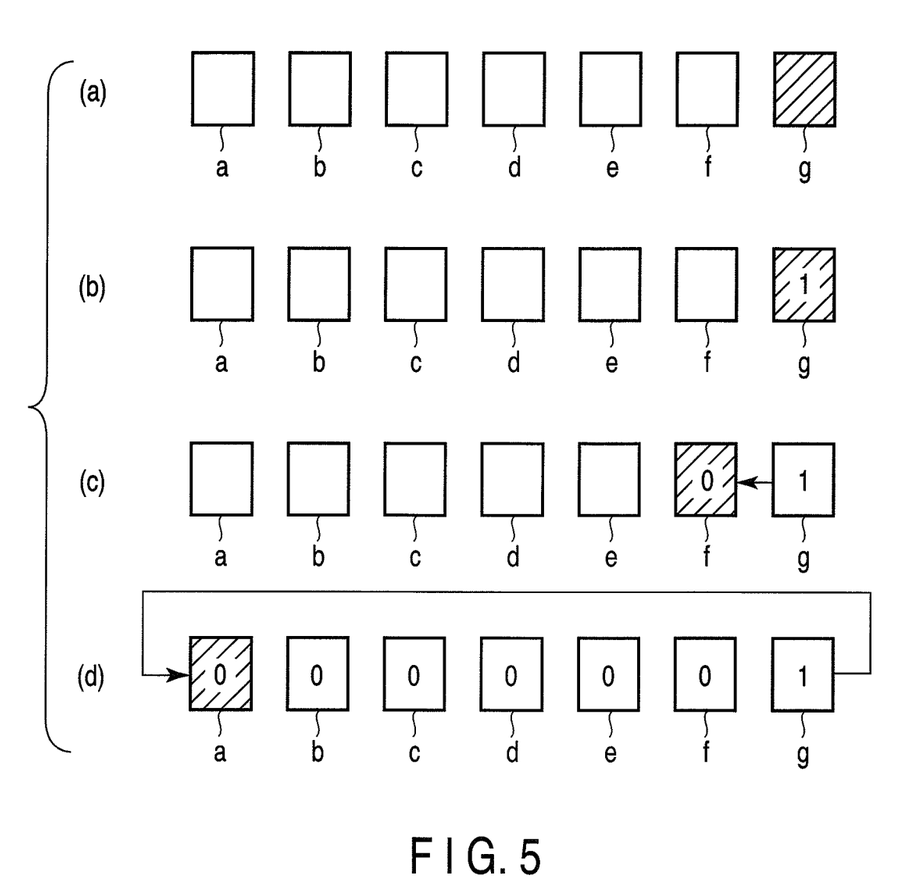
FIG. 5 is a diagram for explaining a second example of the number input operation performed using the input aiding module of the recording/reproducing apparatus according to the same embodiment.

FIG. 5 shows a second example of inputting numbers in the input columns a to g. When a number input screen 34 is first displayed on the screen of the video display module 22, as shown in (a) of FIG. 5, all the input columns a to g are vacant and the tail end input column g is selected as indicated by hatching.

In the case where the user operates the cursor-up key 27f of the remote controller 27 under this condition, the numbers such as "0", "1", "2", . . . , "9", "(vacant)", "0" are each displayed sequentially in ascending order circularly in the input column g each time of the operation. Also, with the operation of the cursor-down key 27g of the remote controller 27 by the user, the numbers such as "0", "(vacant)", "9", "8", . . . , "1", "0" are each displayed sequentially in descending order in the input column g circularly each time of the operation.

In the case where the user operates the Enter key 27j of the remote controller 27 with "1" displayed in the input column g as shown in (b) of FIG. 5, for example, the number "1" is set in the input column g.

With the user operation of the cursor-left key 27h of the remote controller 27 after setting a predetermined number ("1" in the case under consideration) in the input column g as described above, the input column f next to be the tail end input column, i.e. nearer by one column to the head than the tail end input column g is selected as indicated by hatching as shown in (c) of FIG. 5, and a predetermined number ("0" in the case under consideration) is automatically displayed in the input column f.

The user, therefore, can set the number "0" in the input column f directly by operating the Enter key 27j of the remote controller 27.

In setting a number other than "0" in the input column f, on the other hand, the user can freely change the number displayed in the input column f, by operating the cursor-up key 27f or the cursor-down key 27g of the remote controller 27. The number to be set in the input column f, once displayed in the input column f, can be set in the input column f by the user operating the Enter key 27j of the remote controller 27.

In the case where the user operates the cursor-left key 27h of the remote controller 27 after a predetermined number is set in the input column f, the input column e next to be the tail end input column, i.e. nearer by one column to the head than the input column f is selected, and a predetermined number ("0" in the case under consideration) is automatically displayed in the input column e.

The number "0" displayed in the input column e can also be set directly by the user operating the Enter key 27j of the remote controller 27. Also, the number "0" displayed in the input column e can be freely changed by the user operating the cursor-up key 27f or the cursor-down key 27g of the remote controller 27. Thus, by operating the Enter key 27j of the remote controller 27, the user can set the number displayed in the input column e.

The operation for the remaining input columns a to d is also similar to the aforementioned cases, and performed in such a manner that a predetermined number, after being set in the following (right adjacent) input column, is automatically selected and displayed by the user operating the cursor-left key 27h of the remote controller 27. In this way, the user can select and set a number. By repeating this operation, numbers can be set in all the input columns a to g.

Further, assume that as shown in (b) of FIG. 5, after a predetermined number ("1" in the case under consideration) is set in the tail end input column g, the user operates the cursor-right key 27i of the remote controller 27, i.e. the operation is performed to select the tail end (least significant digit) input column with the tail end (least significant digit) input column g already selected.

Then, as shown in (d) of FIG. 5, the head input column a is selected as indicated by hatching, and at the same time, a predetermined number ("0" in the case under consideration) is automatically displayed in all the input columns (the columns a to f in the case under consideration) remaining vacant at the time of selection of the head input column a.

As a result, with regard to each input column in which the number "0" is to be set among the input columns a to f, the user selects the particular input column by operating the cursor-left key 27h or the cursor-right key 27i of the remote controller 27, and by operating the Enter key 27j, can set the number "0".

With regard to each input column in which a number other than "0" is to be set among the input columns a to e, on the other hand, the user selects the particular input column by operating the cursor-left key 27h or the cursor-right key 27i of the remote controller 27, and changes the number on display in the particular column by operating the cursor-up key 27f or the cursor-down key 27g of the remote controller 27. Once the number to be set is displayed in the input column, the user sets the number on display in the same input column by operating the Enter key 27j of the remote controller 27.

According to the second example described above, in the case where the operation of selecting the tail end (least significant digit) input column is performed with the tail end (least significant digit) input column g already selected, the head input column a is selected while at the same time displaying a predetermined number automatically in all the then vacant input columns.

As the result of inputting a predetermined number collectively in a plurality of input columns as described above, the user is not required to perform the operation of inputting a number in each of a plurality of input columns one by one, and therefore, the user operation can be facilitated for a sufficiently high practicability.

Figure 6:
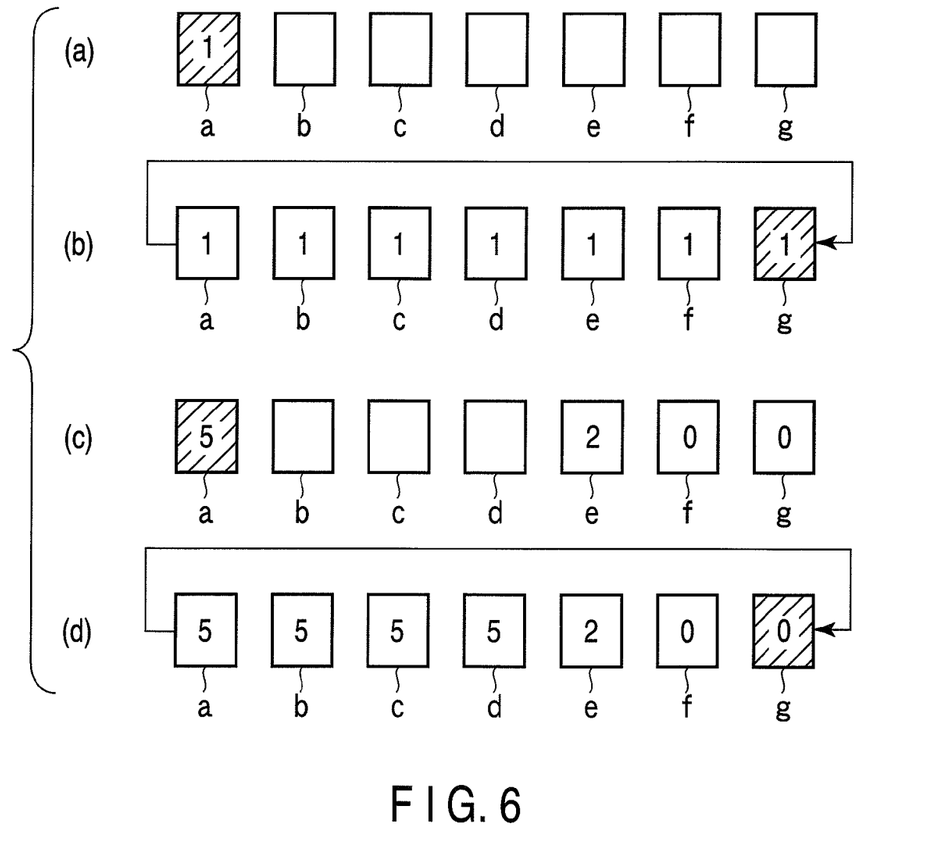
FIG. 6 is a diagram for explaining a third example of the number input operation performed using the input aiding module of the recording/reproducing apparatus according to the same embodiment.

FIG. 6 shows a third example in which a number is input in each of the input columns a to g. The basic operation of this third example is similar to that of the first example described above, and therefore, only different points from the first example are described below.

Specifically, as shown in (a) of FIG. 6, assume that the head input column a is selected and after a predetermined number ("1" in the case under consideration) is set therein, the user operates the cursor-left key 27h of the remote controller 27. In other words, assume that the operation of selecting the head (most significant digit) input column is performed with the head (most significant digit) input column a already selected.

In this case, as shown in (b) of FIG. 6, the tail end input column g is selected as indicated by hatching in FIG. 6, and at the same time, a predetermined number ("1" in the case under consideration) set in the head input column a is displayed automatically in all the then vacant input columns (b to g in the case under consideration).

With regard to each input column in which the number "1" is to be set among the input columns b to g, therefore, the user operates the cursor-left key 27h or the cursor-right key 27i of the remote controller 27, and by thus selecting the particular input column and operating the Enter key 27j, can set the number "1" therein.

With regard to each input column in which a number other than "1" is to be set among the input columns b to g, on the other hand, the user selects the particular input column by operating the cursor-left key 27h or the cursor-right key 27i of the remote controller 27, and changes the number on display in the selected input column by operating the cursor-up key 27f or the cursor-down key 27g of the remote controller 27. Once the number to be set is displayed in the particular input column thereafter, the user sets the number on display in the input column by operating the Enter key 27j of the remote controller 27.

Further, assume that, as shown in (c) of FIG. 6, with "5", "2", "0", "0" set in the input columns a, e, f and g, respectively, and the head input column a selected, the user operates the cursor-left key 27h of the remote controller 27, i.e. that the operation is performed to select the head (most significant digit) input column with the head (most significant digit) input column a already selected.

In this case, as shown in (d) of FIG. 6, the tail end input column g is selected as indicated by hatching in FIG. 6, and at the same time, a predetermined number ("5" in the case under consideration) set in the head input column a is displayed automatically in all the then vacant input columns (b, c and d in the case under consideration).

In each input column in which the number "5" is to be set among the input columns b, c and d, therefore, the user, by operating the cursor-left key 27h or the cursor-right key 27i of the remote controller 27 and thus selecting the particular input column, can set the number "5" therein by operating the Enter key 27j.

Also, in each input column in which a number other than "5" is to be set among the input columns b, c and d, the particular input column is selected by operating the cursor-left key 27h or the cursor-right key 27i of the remote controller 27, and the number displayed in the selected input column is changed by operating the cursor-up key 27f or the cursor-down key 27g of the remote controller 27. The number to be set, once displayed in this input column, is set by the user operating the Enter key 27j of the remote controller 27.

According to the third example described above, in the case where the operation of selecting the head (most significant digit) input column is performed with the head (most significant digit) input column a already selected and a predetermined number set therein, the tail end input column g is selected and, at the same time, the number set in the head input column a is displayed automatically in all the then vacant input columns.

As the result of inputting a predetermined number in a plurality of input columns collectively as described above, the user is not required to perform the operation of inputting the same number in a plurality of input columns one by one, thereby facilitating the user operation for a sufficiently high practical value.

Figure 7:
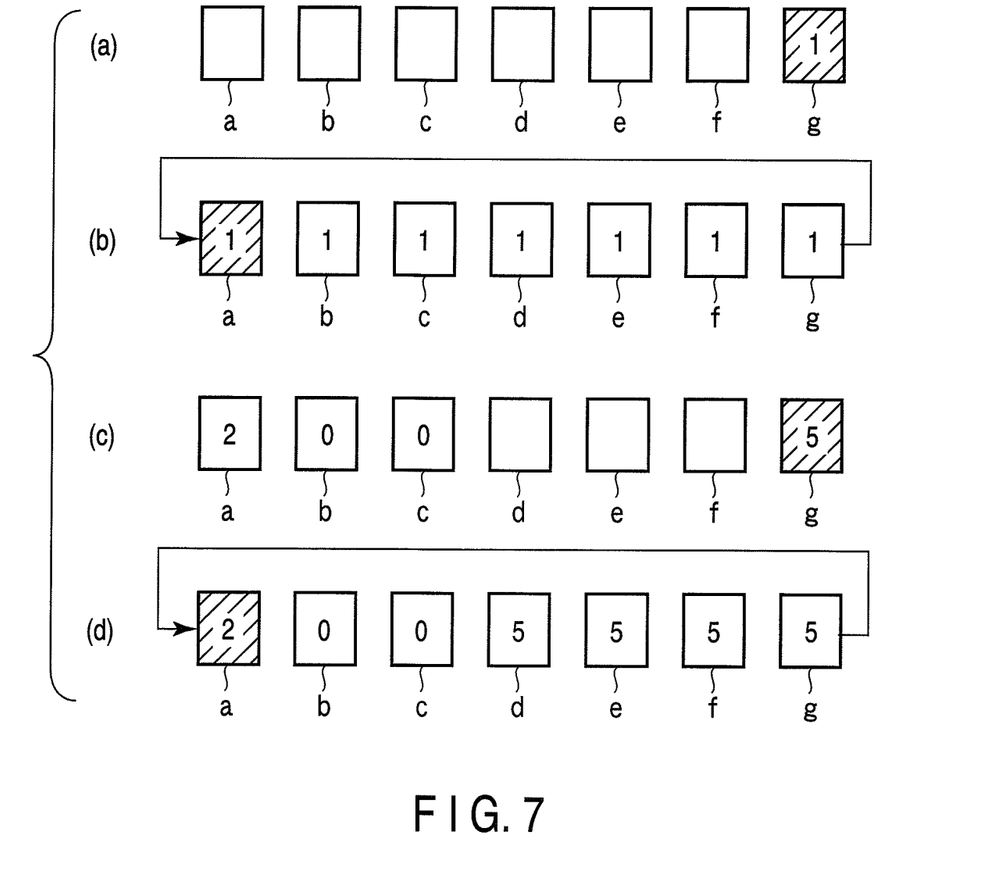
FIG. 7 is a diagram for explaining a fourth example of the number input operation performed using the input aiding module of the recording/reproducing apparatus according to the same embodiment.

FIG. 7 shows a fourth example in which a number is input in each of the input columns a to g. The operation of this fourth example is basically similar to that of the second example described above, and therefore, only the points different from those of the second example are explained.

Specifically, as shown in (a) of FIG. 7, assume that after selecting the tail end input column g and setting a predetermined number ("1" in the case under consideration) therein, the user operates the cursor-right key 27i of the remote controller 27, i.e. performs the operation of selecting the tail end (least significant digit) input column with the tail end (least significant digit) input column g already selected.

In this case, as shown in (b) of FIG. 7, the head input column a is selected as indicated by hatching, and at the same time, a predetermined number ("1" in the case under consideration) set in the tail end input column g is displayed automatically in all the then vacant input columns (the columns a to f in the case under consideration).

In each input column in which the number "1" is to be set among the input columns a to f, therefore, the user operates the cursor-left key 27h or the cursor-right key 27i of the remote controller 27, and by thus selecting the particular input column and operating the Enter key 27j, can set the number "1".

Also, in each input column in which a number other than "1" is to be set among the input columns a to f, the user selects the input column by operating the cursor-left key 27h or the cursor-right key 27i of the remote controller 27, and by operating the cursor-up key 27f or the cursor-down key 27g of the remote controller 27, changes the number displayed in the selected input column. After that, the number to be set, once displayed in the input column, is set by the user operating the Enter key 27j of the remote controller 27.

Further, assume that, as shown in (c) of FIG. 7, numbers "2", "0", "0", "5" are set in the input columns a, b, c, g, respectively, and the user operates the cursor-right key 27i of the remote controller 27 with the tail end input column g selected, i.e. that the user performs the operation to select the tail end (least significant digit) input column with the tail end (least significant digit) input column g already selected.

In this case, as shown in (d) of FIG. 7, the head input column a is selected as indicated by hatching and, at the same time, the number ("5" in the case under consideration) set in the tail end input column g is displayed automatically as a predetermined number in all the then vacant input columns (the columns d, e and f in the case under consideration).

With regard to each input column in which the number "5" is to be set among the input columns d, e, f, therefore, the user selects the particular input column by operating the cursor-left key 27h or the cursor-right key 27i of the remote controller 27, and by operating the Enter key 27j, can set the number "5".

With regard to each input column in which a number other than "5" is to be set among the input columns d, e, f, on the other hand, the user selects the particular input column by operating the cursor-left key 27h or the cursor-right key 27i of the remote controller 27, and changes the number displayed in the input column thus selected, by operating the cursor-up key 27f or the cursor-down key 27g of the remote controller 27. In the case where the number to be set is displayed in the particular input column subsequently, the user sets the number on display in the input column by operating the Enter key 27j of the remote controller 27.

According to the fourth example described above, in the case where the operation of selecting the tail end (least significant digit) input column is performed with the tail end (least significant digit) input column g selected and a predetermined number set in the particular tail end column, then the head input column a is selected, and at the same time, the number set in the tail end input column g is displayed automatically in all the then vacant input columns.

As the result of collectively inputting a predetermined number in a plurality of input columns as described above, the user is not required to input the same number in a plurality of input columns one by one, thus facilitating the user operation for a sufficiently high practicability.

Figure 8:
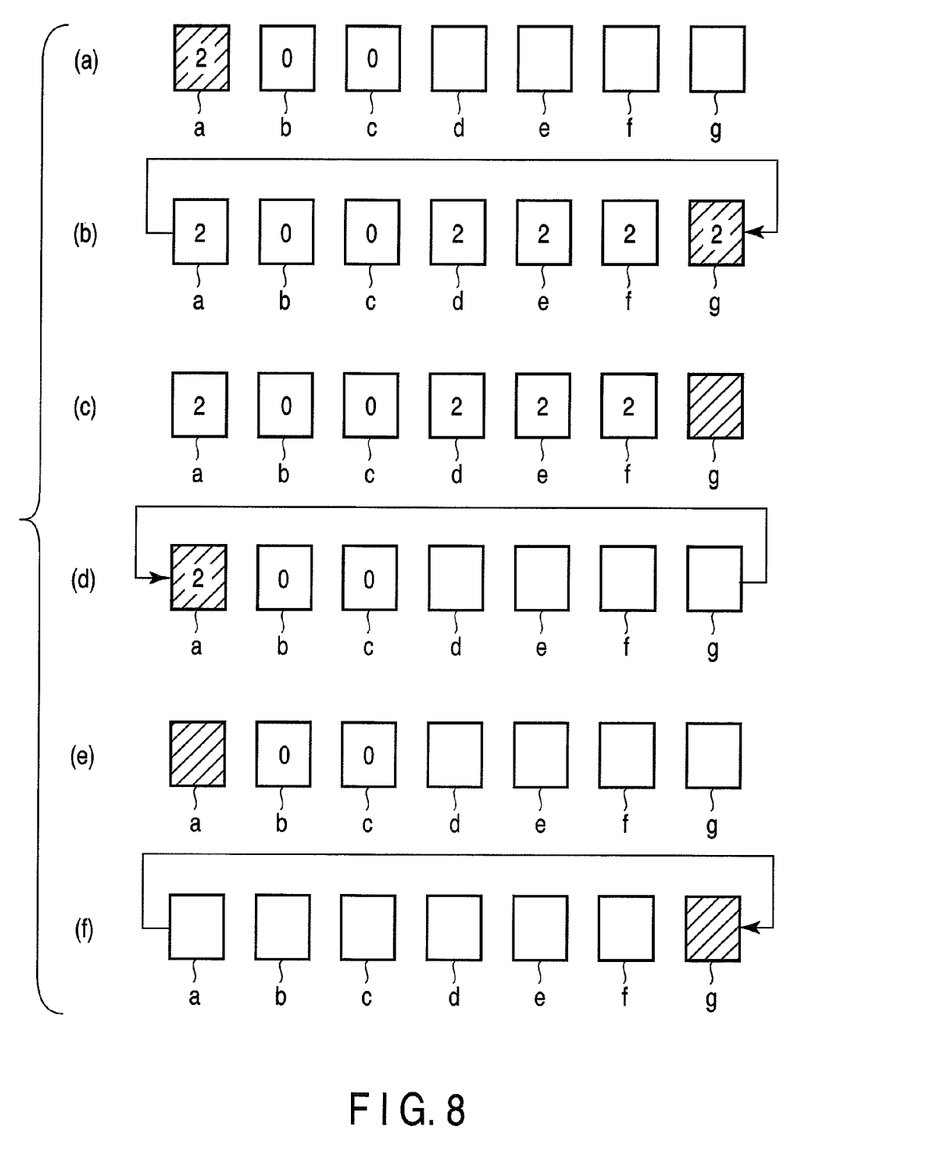
FIG. 8 is a diagram for explaining a fifth example of the number input operation performed using the input aiding module of the recording/reproducing apparatus according to the same embodiment.

FIG. 8 shows a fifth example in which a number is input in each of the input columns a to g. The basic operation of the fifth example is similar to that of the third and fourth examples described above, and therefore, only the points different from those of the third and fourth examples are explained below.

Specifically, assume that numbers "2", "0", "0" are set in the input columns a, b, c, respectively, as shown in (a) of FIG. 8 and the user operates the cursor-left key 27h of the remote controller 27 with the head input column a selected, that is to say, the user performs the operation of selecting the head (most significant digit) input column with the head (most significant digit) input column a selected.

In such a case, as shown in (b) of FIG. 8, the tail end input column g is selected as indicated by hatching, and at the same time, the number ("2" in the case under consideration) set in the head input column a is displayed automatically in all the then vacant input columns (the columns d, e, f, g in the case under consideration).

Assume that as shown in (c) of FIG. 8, the user selects the tail end input column g and operates the cursor-right key 27i of the remote controller 27 after vacating the input column g, i.e. the user performs the operation of selecting the tail end (least significant digit) input column with the tail end (least significant digit) input column g already selected.

In such a case, as shown in (d) of FIG. 8, the head input column a is selected as indicated by hatching, and at the same time, the input columns d, e, f in which the number "2" set in the head input column a has thus far been displayed are restored to vacant columns.

Also, assume that as shown in (e) of FIG. 8, the user selects the head input column a and operates the cursor-left key 27h of the remote controller 27 after vacating the input column a, i.e. the user performs the operation of selecting the head (most significant digit) input column with the head (most significant digit) input column a already selected. In such a case, as shown in (f) of FIG. 8, the tail end input column g is selected as indicated by hatching, while at the same time restoring the input columns b, c to the vacant state.

According to the fifth example described above, a predetermined number set in a plurality of input columns can be collectively input, and the input columns in which the numbers are input collectively can be restored to the vacant state collectively. Therefore, the user operation can be facilitated to secure a sufficiently high practicability.

Next, an explanation is given about a case in which a predetermined number to be displayed in each of a plurality of vacant input columns is set by performing the operation of selecting the head input column with the head input column a already selected with the result that the tail end input column is selected or by performing the operation of selecting the tail end input column with the tail end input column g already selected with the result that the head input column is selected.

Figure 9:
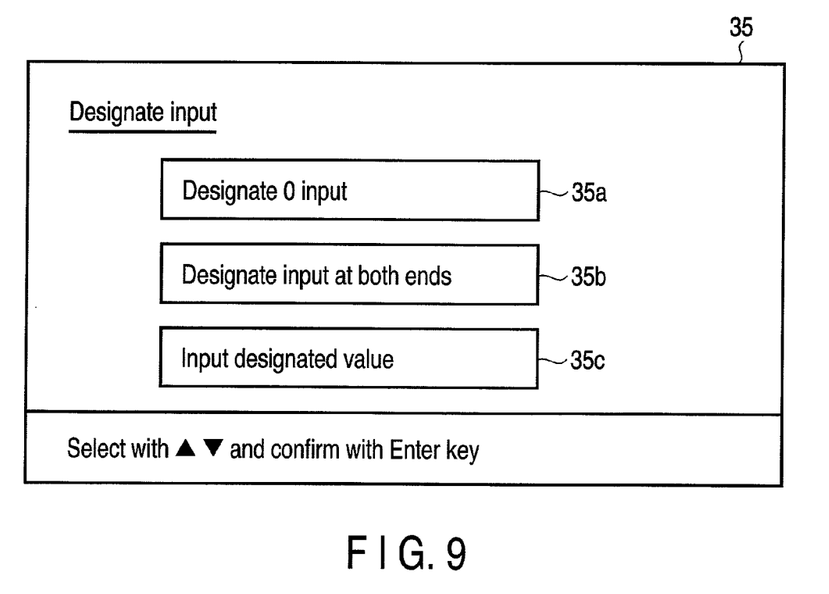
FIG. 9 is a diagram for explaining an example of an input designation screen displayed on the recording/reproducing apparatus according to the same embodiment.

In such a case, the user operates the menu key 27d of the remote controller 27 and, by making his/her way into a plurality of menu screens in a hierarchical structure, displays an input designation screen 35 on the screen of the video display module 22, for example, as shown in FIG. 9. Three items 35a, 35b, 35c including "zero input designation", "both ends input designation" and "designated value input" are displayed on the input designation screen 35.

The user operates the cursor-up key 27f or the cursor-down key 27g of the remote controller 27, and by selecting any of the items 35a to 35c and operating the Enter key 27j, can set a predetermined number to be displayed in each of a plurality of vacant input columns.

Of these items, assume that "zero input designation" of item 35a is selected and determined. In the case where the operation of selecting the head input column is performed with the head input column a already selected with the result that the tail end input column is selected or in the case where the operation of selecting the tail end input column is performed with the tail end input column g already selected with the result that the head input column a is selected, then the predetermined number to be displayed in each of the plurality of the vacant input columns is "0".

On the other hand, assume that "both ends input designation" of item 35b is selected and determined. In the case where the operation of selecting the head input column is performed with the head input column a already selected with the result that the tail end input column is selected, the predetermined number displayed in each of the plurality of vacant input columns is identical with the number set in the head input column a. In the case where the operation of selecting the tail end input column is performed with the tail end input column g already selected with the result that the head input column a is selected, on the other hand, the predetermined number displayed in each of the plurality of vacant input columns is identical with the number set in the tail end column g.

Further, assume that "designated value input" of item 35c is selected and determined. In the case where the operation of selecting the head input column is performed with the head input column a already selected with the result that the tail end input column is selected or in the case where the operation of selecting the tail end input column is performed with the tail end input column g already selected with the result that the head input column a is selected, then the predetermined number displayed in each of the plurality of vacant input columns can be set by the user.

Figure 10:
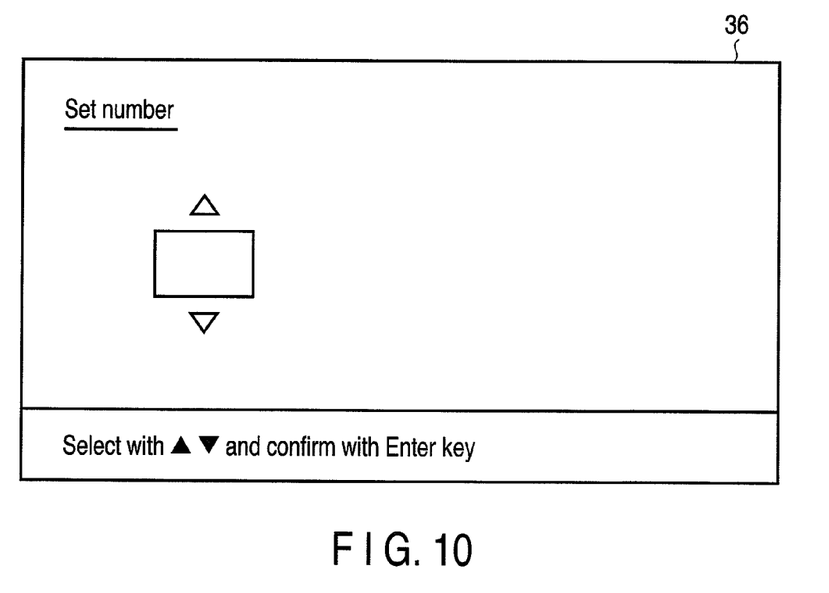
FIG. 10 is a diagram for explaining an example of a number setting screen displayed on the recording/reproducing apparatus according to the same embodiment.

Specifically, once the "designated value input" of item 35c is selected and determined, as shown by an example in FIG. 10, the number setting screen 36 is displayed on the screen of the video display module 22. A number display module 36a is displayed on the number setting screen 36. Then, each time the user operates the cursor-up key 27f of the remote controller 27, numbers such as "0", "1", "2", . . . , "9", "(vacant)" and "0" are sequentially displayed in a circle in ascending order in the input column a.

Also, each time the user operates the cursor-down key 27g of the remote controller 27, numbers such as "0", "(vacant)", "9", "8", . . . , "1" and "0" are sequentially displayed in a circle in descending order in the input column a. In the case where the user operates the Enter key 27j of the remote controller 27 with a predetermined number displayed on the number display module 36a, the particular number is set.

Figure 11:
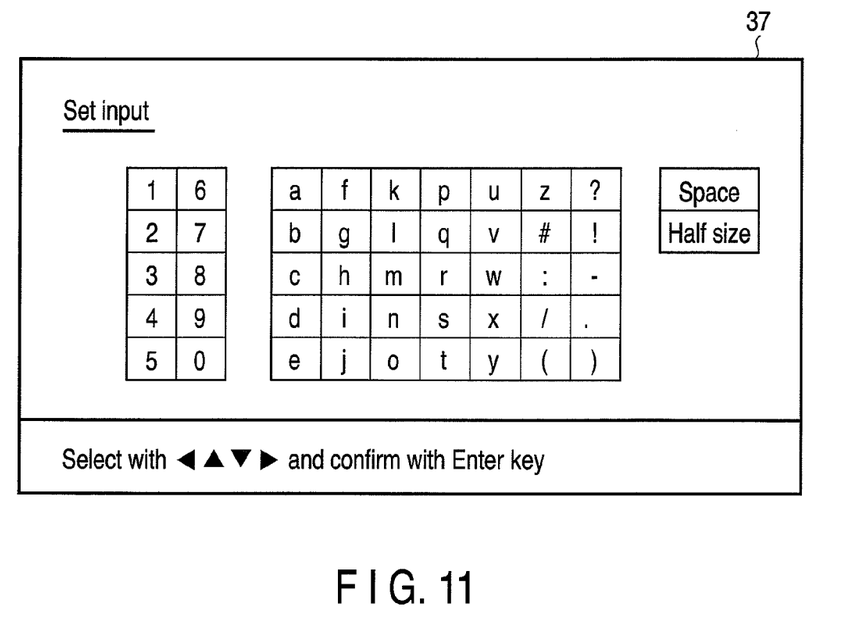
FIG. 11 is a diagram for explaining an example of an input setting screen displayed on the recording/reproducing apparatus according to the same embodiment.

Incidentally, in the case where the "designated value input" of item 35c is selected and determined, as shown by an example in FIG. 11, the input setting screen 37 can be displayed also on the screen of the video display module 22. English letters and various codes as well as numbers are displayed on the input setting screen 37.

The user, by operating the cursor-up, down, left and right keys 27f to 27i of the remote controller 27, can select the desired number, English letter or code, which can be set by operating the Enter key 27j. As a result, not only a number but also any of English letters or various codes can be collectively input in a plurality of vacant input columns.

Also, in the case where the contents to be input include not only numbers but also English letters or any of various codes as shown on the number input screen 34 to input the postal code previously illustrated in FIG. 3, the input setting screen 37 shown in FIG. 11 can be displayed and input by way of the particular input screen without the "designated value input" of item 35c on the input designation screen 35 described above.

In the case where numbers, English letters or any of various codes is input, the manner in which they are input as shown in the first to fifth examples described above can of course be used in any of various combinations without developing a conflict.

Figure 12:
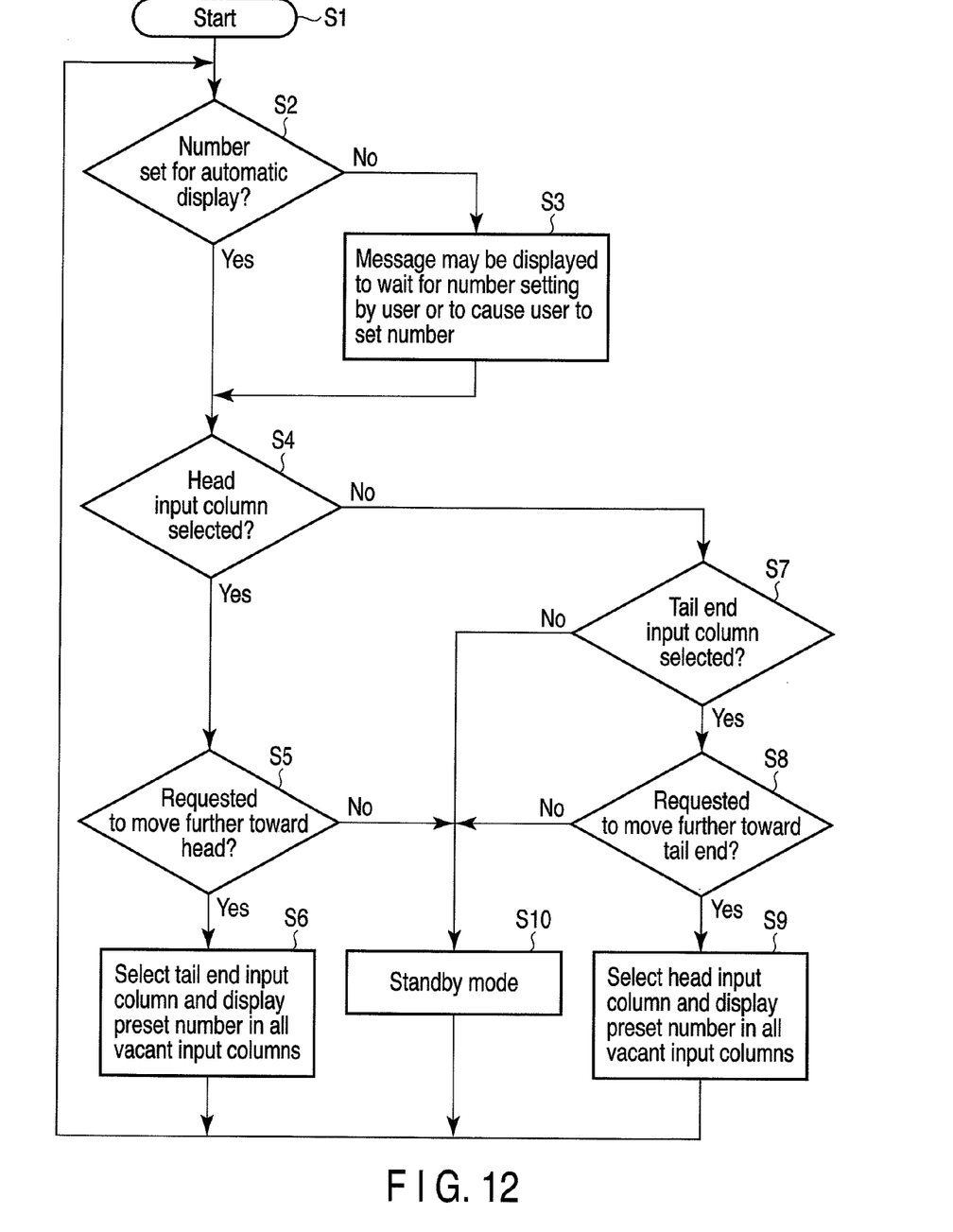
FIG. 12 is a flowchart for explaining an example of the main processing operation performed by the input aiding module of the recording/reproducing apparatus according to the same embodiment.

FIG. 12 shows a flowchart summarizing the input aiding operation performed by the input aiding module 25c described above. Although the operation with a number input is explained in FIG. 12, the operation is of course similar also in the case where an English letter or any of various codes other than numbers is input.

Specifically, once the process is started (step S1), the input aiding module 25c determines whether a predetermined number to be automatically displayed in a plurality of vacant input columns is already set or not in step S2, in the case where the operation of selecting the head input column is performed with the head input column already selected with the result that the tail end input column is selected or in the case where the operation of selecting the tail end input column is performed with the tail end input column already selected with the result that the head input column is selected.

In the case where a predetermined number is not so set (NO), the input aiding module 25c waits until a number is set by the user in step S3. In the case where the number displayed automatically in vacant input columns is not set by the time when the number input screen 34 shown in FIG. 3 is displayed, for example, the input aiding module 25c can display a message requesting the user to set the number.

Once a number is set in step S3 in this way or upon determination in step S2 that a number is already set (YES), the input aiding module 25c determines in step S4 whether the currently selected input column is the head one or not.

Upon determination that the head input column is selected (YES), the input aiding module 25c determines in step S5 whether the cursor-left key 27h is operated or not, i.e. whether the operation is performed to select the head input column with the head input column already selected.

Upon determination that the cursor-left key 27h is operated (YES), the input aiding module 25c selects the tail end input column and displays a predetermined number in all the then vacant input columns in step S6, followed by returning to the process of step S2.

Upon determination in step S4 that the head input column is not selected (NO), on the other hand, the input aiding module 25c determines in step S7 whether the currently selected input column is the tail end one or not.

Upon determination that the tail end input column is selected (YES), the input aiding module 25c determines in step S8 whether the cursor-right key 27i is operated or not, i.e. whether the operation is performed to select the tail end input column with the tail end input column already selected.

Upon determination that the cursor-right key 27i is operated (YES), the input aiding module 25c selects the head input column in step S9, and displays a predetermined number in all the then vacant input columns, followed by returning to the process of step S2.

Also, upon determination in step S5 that the cursor-left key 27h is not operated (NO), in step S7 that the tail end input column is not selected (NO) and in step S8 that the cursor-right key 27i is not operated (NO), then in step S10, the input aiding module 25c enters a standby mode while the currently selected input column remains selected, followed by returning to the process of step S2. In this standby mode, a low order digit (right adjacent) input column is sequentially selected each time the cursor-right key 27*i* is operated, while a high order digit (left adjacent) input column is sequentially selected each time the cursor-left key 27*h* is operated.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An input aiding apparatus comprising:
a display module configured to display a plurality of input columns comprising a head input column and a tail end input column;
a selector configured to sequentially select, from tail end to head or from head to tail end, the plurality of input columns displayed in the display module;
an input module configured to enter a selected number, character or code in each selected input column; and
an aiding module configured to select the tail end input column while collectively and automatically displaying a selected predetermined number, character or code in blank input columns if the selection of a head input column is requested by the selector while the head input column is selected,
wherein the aiding module is configured to collectively display the selected number, character or code displayed in the head input column,
wherein the input module is configured to clear the selected input column, and
the aiding module is configured to select the head input column and to clear the input columns when the tail end input column is selected, in response to a request from the selector to select an input column further toward the tail end while the selected tail end input column is cleared.

2. The input aiding apparatus of claim 1,
wherein the aiding module comprises a setting module configured to preset a selected number, character, or code to be displayed collectively.

3. An input aiding apparatus comprising:
a display module configured to display a plurality of input columns comprising a head input column and a tail end input column;
a selector configured to sequentially select, from tail end to head or from head to tail end, the plurality of input columns displayed in the display module;
an input module configured to input a selected number, character or code in the selected input column; and
an aiding module configured to select the head input column and automatically and to collectively display a predetermined number, character or code in blank input columns in response to a request from the selector to select an input column toward the tail end while the tail end input column is selected,
wherein the aiding module is configured to collectively display the selected number, character or code displayed in the tail end input column,
wherein the input module is configured to clear the selected input column, and
the aiding module is configured to select the tail end input column and to clear the selected input columns when the head input column is selected, in response to a request from the selector to select an input column further toward the head while the selected head input column is cleared.

4. The input aiding apparatus of claim 3,
wherein the aiding module comprises a setting module configured to preset a selected number, character, or code to be displayed collectively.

* * * * *